US010075071B2

(12) United States Patent
Park et al.

(10) Patent No.: US 10,075,071 B2
(45) Date of Patent: Sep. 11, 2018

(54) ELECTRONIC DEVICE INCLUDING A POWER MANAGEMENT INTEGRATED CIRCUIT

(71) Applicant: SAMSUNG ELECTRONICS CO., LTD., Suwon-si, Gyeonggi-do (KR)

(72) Inventors: Young Min Park, Seoul (KR); Young Hoon Lee, Seoul (KR); Yus Ko, Yongin-si (KR); Hwa Yeal Yu, Bucheon-si (KR); Min Ho Choi, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/652,701

(22) Filed: Jul. 18, 2017

(65) Prior Publication Data

US 2018/0048230 A1 Feb. 15, 2018

(30) Foreign Application Priority Data

Aug. 9, 2016 (KR) .................. 10-2016-0101029

(51) Int. Cl.
*H02M 3/156* (2006.01)
*G05F 1/56* (2006.01)
*H02M 1/08* (2006.01)
*H02M 3/158* (2006.01)
*H02M 1/00* (2006.01)

(52) U.S. Cl.
CPC ............. *H02M 3/156* (2013.01); *G05F 1/56* (2013.01); *H02M 1/08* (2013.01); *H02M 3/1584* (2013.01); *H02M 2001/0019* (2013.01); *H02M 2001/0045* (2013.01); *H02M 2003/1566* (2013.01)

(58) Field of Classification Search
CPC .................. H02M 3/156; H02M 1/08; H02M 2001/0045; G05F 1/56
See application file for complete search history.

(56) References Cited

U.S. PATENT DOCUMENTS

| 7,523,337 | B2 | 4/2009 | Borkar et al. |
| 7,667,447 | B2 | 2/2010 | Huang et al. |
| 7,772,812 | B2 | 8/2010 | Shuey |
| 8,134,848 | B2 | 3/2012 | Whittam et al. |
| 8,769,329 | B1 | 7/2014 | Hsiao et al. |

(Continued)

FOREIGN PATENT DOCUMENTS

| CN | 105529926 | 4/2016 |
| JP | 2014-204532 | 10/2014 |
| KR | 1020160045954 | 4/2016 |

*Primary Examiner* — Jue Zhang
(74) *Attorney, Agent, or Firm* — F. Chau & Associates, LLC

(57) ABSTRACT

An electronic device includes a load device and a power management integrated circuit. The power management integrated circuit is configured to calculate a load power value and provide the load power value to the load device in response to a request from the load device. The power management integrated circuit includes a plurality of regulators and a controller. Each of the plurality of regulators includes a current meter for measuring a load current value to be provided to the load device, and the controller is configured to calculate the load power value by using the load current value measured by the current meter and a load voltage value provided from each of the plurality of regulators to the load device.

18 Claims, 10 Drawing Sheets

(56) References Cited

U.S. PATENT DOCUMENTS

| | | |
|---|---|---|
| 8,867,947 B2 | 10/2014 | Yamazawa |
| 9,203,302 B2 | 12/2015 | Kelly |
| 2009/0273498 A1* | 11/2009 | Goder ................. H02M 3/157 341/141 |
| 2010/0219687 A1* | 9/2010 | Oh ........................... G05F 1/46 307/39 |
| 2014/0333287 A1 | 11/2014 | Gupta et al. |
| 2016/0111958 A1 | 4/2016 | Choi et al. |
| 2016/0139650 A1* | 5/2016 | Santoro ................ G06F 1/3287 713/323 |

* cited by examiner

ELECTRONIC DEVICE INCLUDING A POWER MANAGEMENT INTEGRATED CIRCUIT

CROSS-REFERENCE TO RELATED APPLICATION

This application claims priority under 35 U.S.C. § 119 to Korean Patent Application No. 10-2016-0101029, filed on Aug. 9, 2016 in the Korean Intellectual Property Office, the disclosure of which is incorporated by reference herein in its entirety.

TECHNICAL FIELD

Exemplary embodiments of the inventive concept relate to an electronic device, and more particularly, to an electronic device including a power management integrated circuit.

DISCUSSION OF RELATED ART

Various power circuits have been used to supply power to semiconductor devices. Among them, a power management integrated circuit (PMIC) includes a regulator to supply an operation voltage of a semiconductor device by DC-DC converting the DC power supplied from a power source.

Due to limited power conditions, mobile devices may have a greater degree of control over power consumption, compared to that of conventional devices, to increase efficiency. Accurate determination of power consumption in a mobile device may allow for better control.

SUMMARY

According to an exemplary embodiment of the inventive concept, an electronic device includes a load device and a power management integrated circuit. The power management integrated circuit is configured to calculate a load power value and provide the load power value to the load device in response to a request from the load device. The power management integrated circuit includes a plurality of regulators and a controller. Each of the plurality of regulators includes a current meter for measuring a load current value to be provided to the load device, and the controller is configured to calculate the load power value by using the load current value measured by the current meter and a load voltage value provided from each of the plurality of regulators to the load device.

According to an exemplary embodiment of the inventive concept, an electronic device includes a load device and a power management integrated circuit. The power management integrated circuit is configured to calculate a load power value and provide the load power value to the load device in response to a request from the load device. The power management integrated circuit includes at least one regulator and a controller. The at least one regulator includes a current meter for measuring a load current value to be provided to the load device, and the controller includes an arithmetic unit configured to calculate the load power value by using the load current value measured by the at least one regulator and a load voltage value provided to the load device.

According to an exemplary embodiment of the inventive concept, in a method of operating an electronic device including a load device and a power management integrated circuit, it is determined whether a first enable signal and a control signal have been received from the load device. At a multiplexer included in the power management integrated circuit, a load current value is selected in response to the control signal. Analog-to-digital conversion of the load current value is performed to output a digital load current value. A load power value is calculated using the digital load current value and a load voltage value. The load power value is output to the load device.

BRIEF DESCRIPTION OF THE DRAWINGS

The above and other aspects and features of the inventive concept will become more apparent by describing in detail exemplary embodiments thereof with reference to the accompanying drawings.

DETAILED DESCRIPTION OF THE EMBODIMENTS

Exemplary embodiments of the inventive concept provide an electronic device including a power management integrated circuit capable of calculating a value of the load power supplied to a load device and providing the calculated load power value to the load device.

Figure 1:
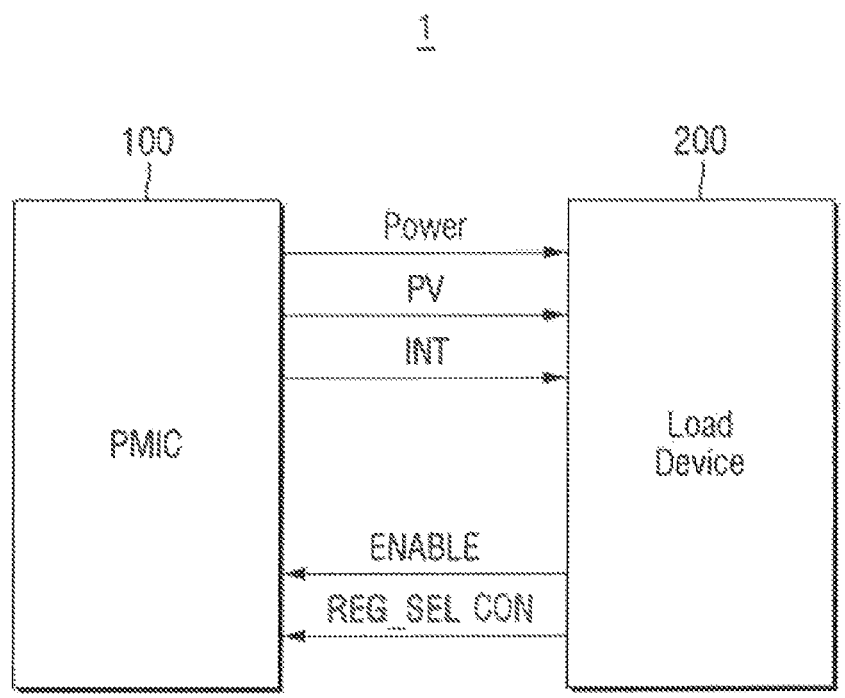
FIG. 1 is a block diagram of an electronic device according to an exemplary embodiment of the inventive concept.

FIG. 1 is a block diagram of an electronic device according to an exemplary embodiment of the inventive concept.

Referring to FIG. 1, an electronic device 1 according to an exemplary embodiment of the inventive concept includes a power management integrated circuit 100 and a load device 200.

The power management integrated circuit 100 may supply DC power to the load device 200. For example, the power management integrated circuit 100 may receive DC power from an external power source, and supply the DC power to the load device 200 by DC-DC conversion.

The power management integrated circuit 100 may include at least one regulator. Hereinafter, for illustrative purposes, the power management integrated circuit 100 includes a switching regulator and a linear regulator.

The load device 200 may be a semiconductor device which is operated by the DC power supplied from the power management integrated circuit 100. The load device 200 may include a semiconductor device such as a central processing unit (CPU), a dynamic random access memory (DRAM), a static random access memory (SRAM), a flash memory, but the inventive concept is not limited thereto. Furthermore, the load device 200 may be a single device or a combination of devices.

The load device 200 may provide an enable signal EN, a regulator selection signal REG_SEL, and a control signal CON to the power management integrated circuit 100. The enable signal EN may be a signal for requesting the transmission of a load power value PV from the power management integrated circuit 100 to the load device 200.

The regulator selection signal REG_SEL may be a signal for selecting a regulator, which measures and provides a load current value, among a plurality of regulators included in the power management integrated circuit 100.

The control signal CON may be a signal for specifying an operation mode in which the power management integrated circuit 100 calculates the load power value PV. The control signal CON may include, for example, a mode signal, an averaging time, and a sampling period of an analog-to-digital converter (ADC) 40 (see FIG. 2) included in the power management integrated circuit 100. The mode signal may select whether the power management integrated circuit 100 calculates the load power value PV in real time or as an average value over a predetermined time period (e.g., the averaging time included in the control signal CON).

Thus, the power management integrated circuit 100 may calculate the load power value PV to be supplied to the load device 200 in real time or as an average value over the averaging time (e.g., 10 seconds) by changing a calculation method in response to the mode signal included in the control signal CON provided by the load device 200.

The power management integrated circuit 100 may provide DC power, the load power value PV, and an interrupt signal INT to the load device 200.

Figure 2:
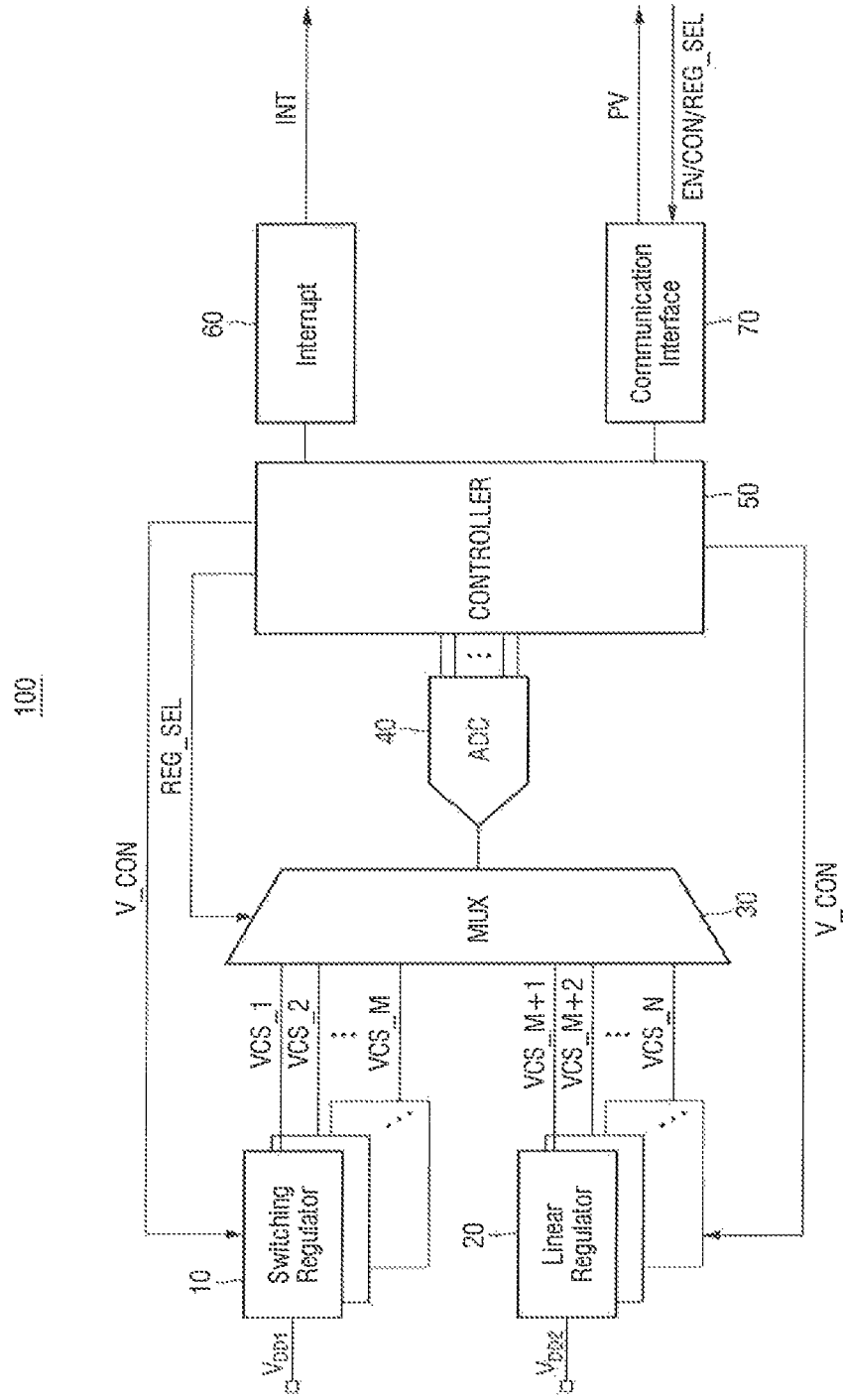
FIG. 2 is a block diagram illustrating a power management integrated circuit included in the electronic device of FIG. 1 according to an exemplary embodiment of the inventive concept.

The load power value PV may be a value calculated by the power management integrated circuit 100 using a load voltage value and a load current value measured by regulators (see FIG. 2). An operation of calculating the load power value PV by the power management integrated circuit 100 will be described below.

FIG. 2 is a block diagram illustrating a power management integrated circuit included in the electronic device of FIG. 1 according to an exemplary embodiment of the inventive concept.

Referring to FIG. 2, the power management integrated circuit 100 may include a switching regulator 10, a linear regulator 20, a multiplexer 30, an analog-to-digital converter 40, a controller 50, an interrupt circuit 60, and a communication interface 70.

The switching regulator 10 may receive a power supply voltage to perform a switching operation according to a control signal provided from the controller 50, and may generate an output voltage $V_{DD1}$ and provide the output voltage $V_{DD1}$ to the load device 200. The switching regulator 10 may include, for example, a buck converter, a boost converter, a buck-boost converter, or the like, but the inventive concept is not limited thereto. For example, the switching regulator 10 may include any regulator that controls an output through a switching operation.

Although it has been illustrated in FIG. 2 that the power management integrated circuit 100 includes M switching regulators 10, the inventive concept is not limited thereto. The M switching regulators 10 are shown for convenience of description, and the number of switching regulators 10 may vary.

Figure 3:
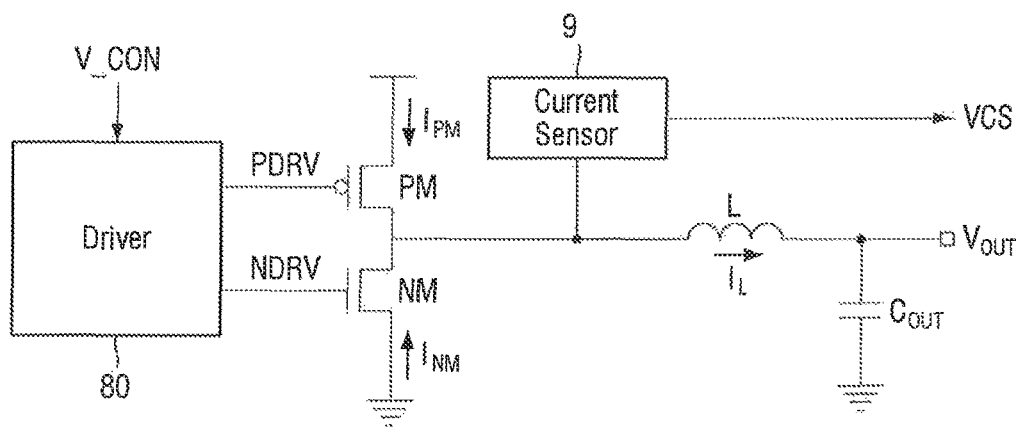
FIG. 3 is a circuit diagram of a switching regulator included in the power management integrated circuit of FIG. 2 according to an exemplary embodiment of the inventive concept.

The switching regulator 10 may include a current meter (or current sensor) 90 (see FIG. 3) for measuring the load current value to be provided to the load device 200. Each current meter 90 may be selected by the regulator selection signal REG_SEL provided by the load device 200 to measure the load current value flowing through an inductor L (see. FIG. 3), and provide the load current value to the multiplexer 30. The load current value, provided from the switching regulator 10 to the multiplexer 30, may be provided in the form of an output voltage (e.g., a load current value VCS). In FIG. 2, the load current value may include load current values VCS_1, VCS_2 ... VCS_M.

The linear regulator 20 may provide an output voltage $V_{DD2}$, controlled according to an input voltage, to the load device 200 by using a transistor operating in a linear region or an active region. The linear regulator 20 may include, for example, a low dropout (LDO) regulator, but the inventive concept is not limited thereto.

Although it has been illustrated that the regulators, included in the electronic device 1 according to an exemplary embodiment of the inventive concept, are the switching regulator 10 and the linear regulator 20, the inventive concept is not limited thereto. According to exemplary embodiments of the inventive concept, the one or more regulators included in the electronic device 1 may be any regulator that can receive an input DC power and provide an output power to the load device by DC-DC conversion.

Each of the switching regulator 10 and the linear regulator 20 may include a current meter to monitor the amount of current flowing through them. Hereinafter, it will be assumed that the switching regulator 10 includes a buck converter and the current meter 90 connected thereto.

FIG. 3 is a circuit diagram of a switching regulator included in the power management integrated circuit of FIG. 2 according to an exemplary embodiment of the inventive concept.

The switching regulator 10 may include a driver 80, a PMOS transistor PM connected to the power supply voltage, a NMOS transistor NM connected to a ground voltage, the inductor L, and a capacitor COUT. The inductor L and the capacitor COUT may be connected to an output terminal of the switching regulator 10.

The driver 80 may be connected to gate terminals of the PMOS transistor PM and the NMOS transistor NM to provide a PMOS driving signal PDRV to the PMOS transistor PM and an NMOS driving signal NDRV to the NMOS transistor NM. The PMOS driving signal PDRV and the NMOS driving signal NDRV may be pulse signals that are turned on/off alternately. In other words, the PMOS transistor PM and the NMOS transistor NM may be turned on or off alternately by the PMOS driving signal PDRV and the NMOS driving signal NDRV, respectively.

In the electronic device 1 according to an exemplary embodiment of the inventive concept, the load current value received by the load device 200 may be a load current value $I_L$ flowing through the inductor L. Thus, the current meter 90 may monitor the load current value $I_L$ flowing through the inductor L, and provide the load current value VCS (in the form of a voltage) to the multiplexer 30.

The capacitor COUT may be connected to the output terminal of the switching regulator 10 to reduce a fluctuation in the output voltage VOUT according to an instantaneous change of the load current value $I_L$ flowing through the inductor L. Accordingly, the capacitor COUT may have a sufficiently large capacitance.

The current meter 90 may monitor, for example, only one of a PMOS transistor current value $I_{PM}$ and an NMOS transistor current value $I_{NM}$. In the electronic device 1 according to an exemplary embodiment of the inventive concept, the current meter 90 includes, for example, an NMOS transistor whose gate terminal is connected to the drain terminals of the NMOS transistor NM and the PMOS transistor PM.

Figure 4:
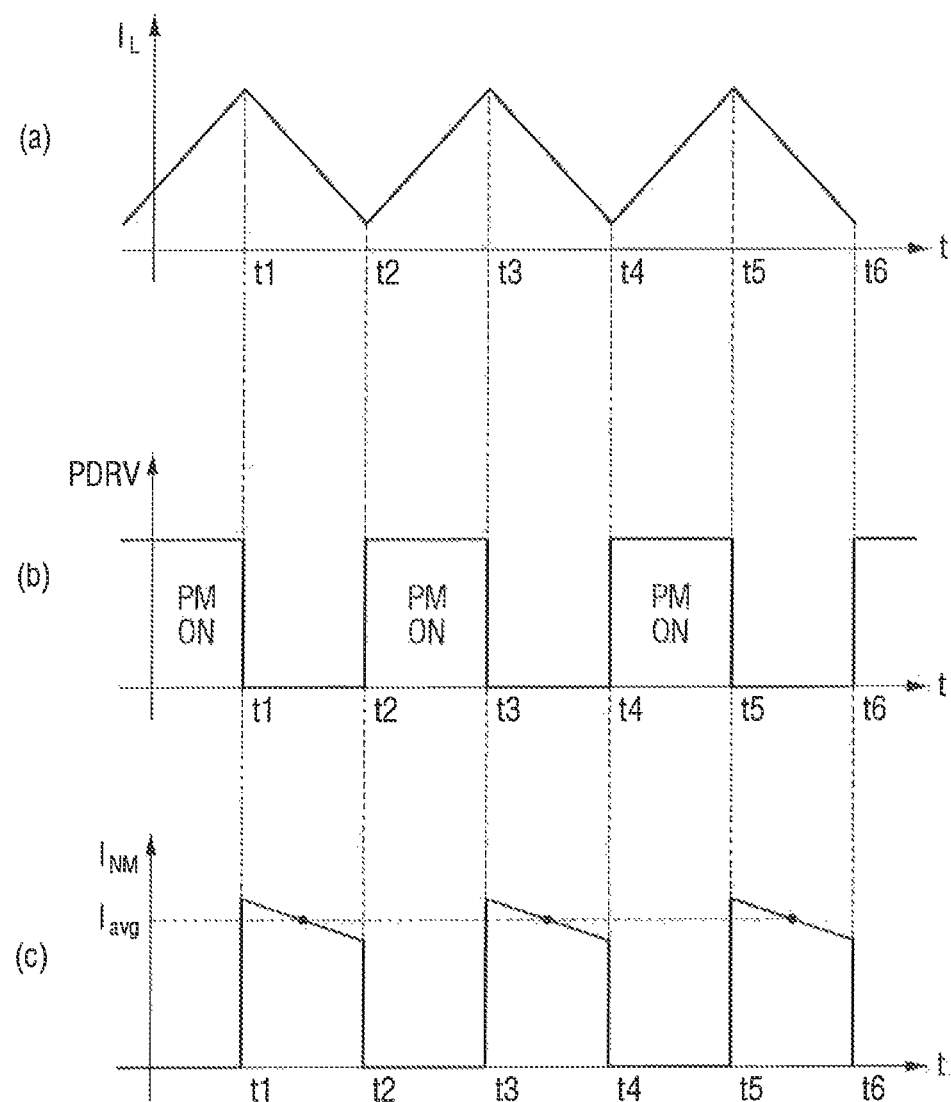
FIG. 4 is a timing chart for explaining an operation of the electronic device of FIG. 1 according to an exemplary embodiment of the inventive concept.

FIG. 4 is a timing chart for explaining an operation of the electronic device of FIG. 1 according to an exemplary embodiment of the inventive concept.

FIG. 4 illustrates changes in the inductor current value $I_L$, the PMOS driving signal PDRV, and the NMOS transistor current value $I_{NM}$ over time t.

The inductor current value $I_L$ may be changed according to the switching operation of the NMOS transistor NM and the PMOS transistor PM by the driver 80. In other words, until time t1, the PMOS transistor PM is turned on and the inductor current value $I_L$ increases. In a time period of t1~t2, while the PMOS transistor PM is turned off and the NMOS transistor NM is turned on, the inductor current value $I_L$ decreases. In a time period of t2~t3, similar to the period prior to the time t1, the inductor current value $I_L$ increases. This operation of the switching regulator 10 and the increase/decrease of the inductor current value $I_L$ may be repeated. The time periods including t1, t2, t3, and t4 may determine the magnitude of the output voltage $V_{DD1}$, and the output voltage $V_{DD1}$ may be determined by the control signal CON provided to the power management integrated circuit 100 from the load device 200. However, the inventive concept is not limited thereto.

To measure the magnitude of the inductor current value $I_L$, one of the PMOS transistor current value $I_{PM}$ and the NMOS transistor current value $I_{NM}$ may be used. In FIG. 4, (c) illustrates an example of obtaining an average current value $T_{avg}$ by using the NMOS transistor current value $I_{NM}$.

For example, in the time period of t1~t2, the NMOS transistor current value $I_{NM}$ may have a maximum value and a minimum value. By using a median value (e.g., the average current value $I_{avg}$) between the maximum value and the minimum value of the NMOS transistor current value $I_{NM}$, the average value of the inductor current value $I_L$ in the time period of t1~t2 can be calculated.

The inductor current value $I_L$ may be converted into a voltage (e.g., the load current value VCS) to be provided to the multiplexer 30.

The configuration and operation of the current meter 90 described above are merely exemplary, and may be modified depending on the design and the configuration of the corresponding regulator.

Referring again to FIG. 2, the multiplexer 30 may select one of load current values VCS_1, VCS_2 . . . VCS_M, VCS_M+1, VCS_M+2 . . . VCS_N provided by the switching regulator 10 and the linear regulator 20 in response to the regulator selection signal REG_SEL provided by the controller, and provide the selected one to the analog-to-digital converter 40.

The analog-to-digital converter (ADC) 40 may perform analog-to-digital conversion on the load current value selected by the multiplexer 30 and provide the converted value to the controller 50. The analog-to-digital converter 40 may be, for example, an ADC using a successive approximation method, but the inventive concept is not limited thereto. The load current value output in the form of digital data by the analog-to-digital converter 40 may have the same number of bits as the input bit number of an arithmetic unit 51 (see FIG. 5A) included in the controller 50.

The controller 50 may provide a voltage command value V_CON to the switching regulator 10 and the linear regulator 20 to control load voltage values (e.g., the output voltages $V_{DD1}$ and $V_{DD2}$) to be provided to the load device 200. For example, the switching regulator 10 may adjust the load voltage value $V_{DD1}$ by adjusting a switching period in accordance with the voltage command value V_CON. Furthermore, the controller 50 may provide the regulator selection signal REG_SEL (provided by the load device 200) to the multiplexer 30, to control transmission of the load current value of the regulator, which is selected by the regulator selection signal REG_SEL, to the analog-to-digital converter 40.

The structure and operation of the controller 50 will be described with reference to FIGS. 5A and 5B.

Figure 5A:
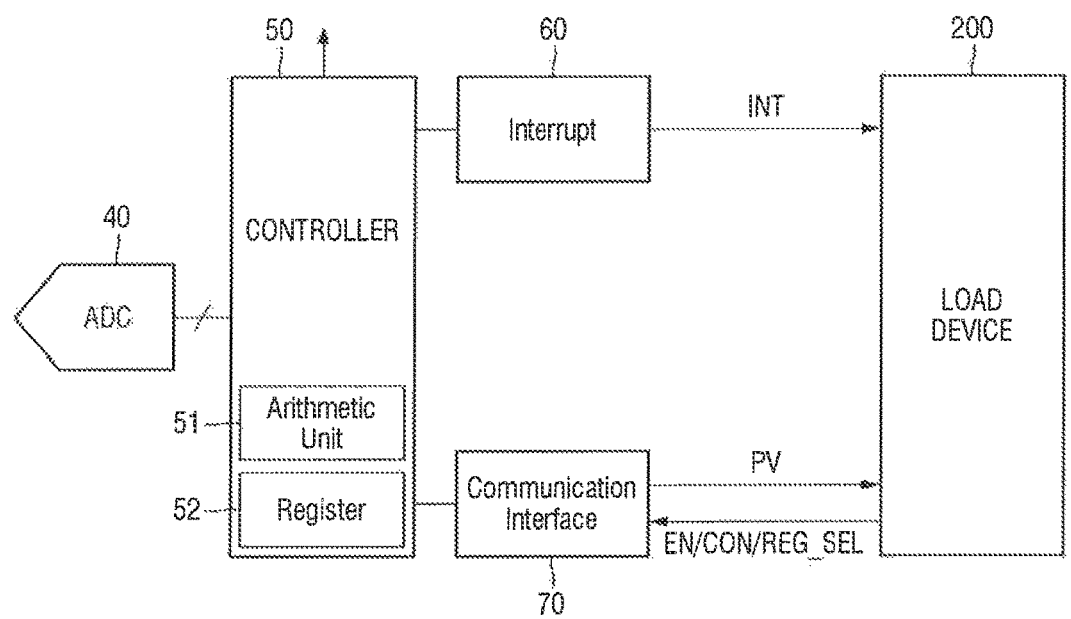
FIGS. 5A and 5B are block diagrams showing a partial circuit included in the electronic device of FIG. 1 according to an exemplary embodiment of the inventive concept.
Figure 5B:
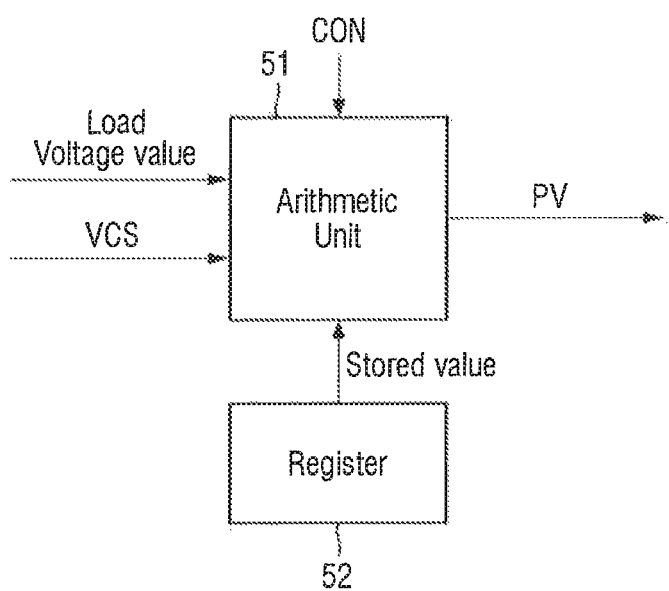

FIGS. 5A and 5B are block diagrams showing a partial circuit included in the electronic device of FIG. 1 according to an exemplary embodiment of the inventive concept.

Referring to FIGS. 5A and 5B, the controller 50 may include the arithmetic unit 51 and a register 52. The arithmetic unit 51 may calculate the load power value PV by using the voltage command value V_CON (which controls the load voltage values) and the load current value (or current measurement value) VCS provided from the multiplexer 30. For example, assuming that the output voltage $V_{DD1}$ is relatively accurately generated by the voltage command value V_CON to be supplied to the load device 200, the load power value PV to be supplied to the load device 200 can be calculated using only the voltage command value V_CON and the load current value VCS.

The register 52 may store a change history of the load current value VCS and the voltage command value V_CON. If the load device 200 requests an average power value for a predetermined period, the controller 50 may calculate the average power value by using the load current value VCS and the voltage command value V_CON stored in the register 52.

As described above, the electronic device 1 according to an exemplary embodiment of the inventive concept may directly calculate the load power value by using the load current value VCS and the load voltage value supplied to the load device 200 from the power management integrated circuit 100. This method enables a more accurate calculation compared to a method of allowing the load device 200 to calculate its power consumption.

The controller 50 may send/receive a signal to/from the load device 200 through the interrupt circuit 60 and the communication interface 70. The controller 50 may provide the interrupt signal INT to the load device 200 via the interrupt circuit 60. The controller 50 may provide the load power value PV to the load device 200 via the communication interface 70. The provision of the interrupt signal INT may occur at substantially the same time as the provision of the load power value PV.

In other words, when the load device 200 requests the load power value PV with the enable signal EN, the power management integrated circuit 100 may calculate the load power value PV using the measured current and voltage values, and then provide the load power value PV with the interrupt signal INT to the load device 200. The interrupt signal INT may be a signal that indicates the termination of an event in which the power management integrated circuit 100 provides the load power value PV to the load device 200. Furthermore, the interrupt signal INT may be a signal indicating that the load power value PV provided by the power management integrated circuit 100 has reached a predetermined value set by the load device 200.

The load device 200 may provide the enable signal EN, the control signal CON, and the regulator selection signal SEL to the controller 50 through the communication interface 70. The enable signal EN may be a signal for initiating an event in which the power management integrated circuit 100 calculates the load power value PV, and the control signal CON may include, for example, a mode signal, an averaging time, and a sampling period of the ADC 40 included in the power management integrated circuit 100. The mode signal may select whether the power management integrated circuit 100 calculates the load power value PV in real time or as an average power value (over the averaging time) in an average value calculation mode.

Figure 6:
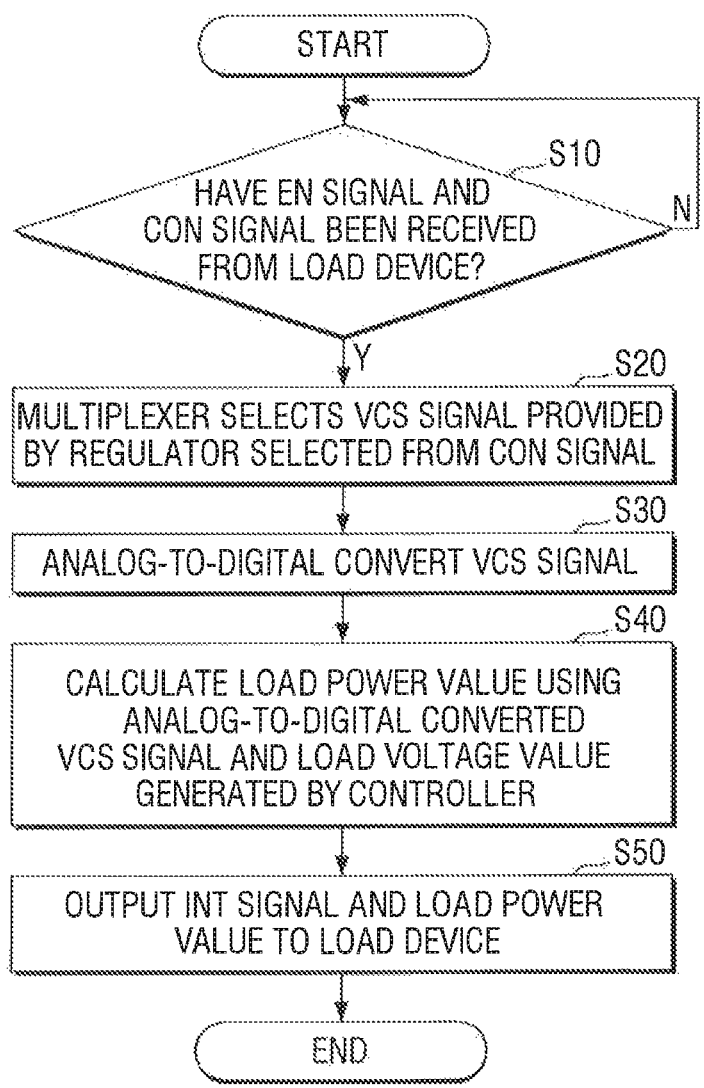
FIG. 6 is a flowchart for explaining an operation of the electronic device of FIG. 1 according to an exemplary embodiment of the inventive concept.

FIG. 6 is a flowchart for explaining an operation of the electronic device of FIG. 1 according to an exemplary embodiment of the inventive concept.

Referring to FIG. 6, the electronic device 1, according to an exemplary embodiment of the inventive concept, confirms whether the enable signal EN and the control signal CON have been received from the load device 200 (S10). Here, the control signal CON may include the regulator selection signal REG_SEL. The load current value VCS, provided by the regulator selected by the control signal CON, is selected by the multiplexer 30 (S20). The load current value VCS selected by the multiplexer 30 is provided to the analog-to-digital converter 40, and the load current value VCS is analog-to-digital converted and provided to the controller 50 (S30).

The controller 50 calculates the load power value PV to be provided to the load device 200 by using the load current value VCS and the load voltage value (S40). The load voltage value may correspond to, for example, the voltage command value V_CON generated by the controller 50 when the load device 200 requests the load power value PV using the enable signal EN and the control signal CON. Alternatively, the load voltage value may be obtained by storing, in the register 52, the change history of the voltage command value V_CON generated by the controller 50 for the averaging time specified in the control signal CON, and calculating, via the arithmetic unit 51, the average value of the voltage command value V_CON over the averaging time. Furthermore, the calculated load power value PV may be processed according to a predetermined rule and provided to the load device 200.

The controller 50 provides the load power value PV and the interrupt signal INT to the load device 200 (S50), and the provision of the load power value PV may be terminated if another enable signal EN is not provided from the load device 200. Alternatively, if a turn-off signal is not provided from the load device 200, the load power value PV may be continuously updated and provided to the load device 200.

Figure 7:
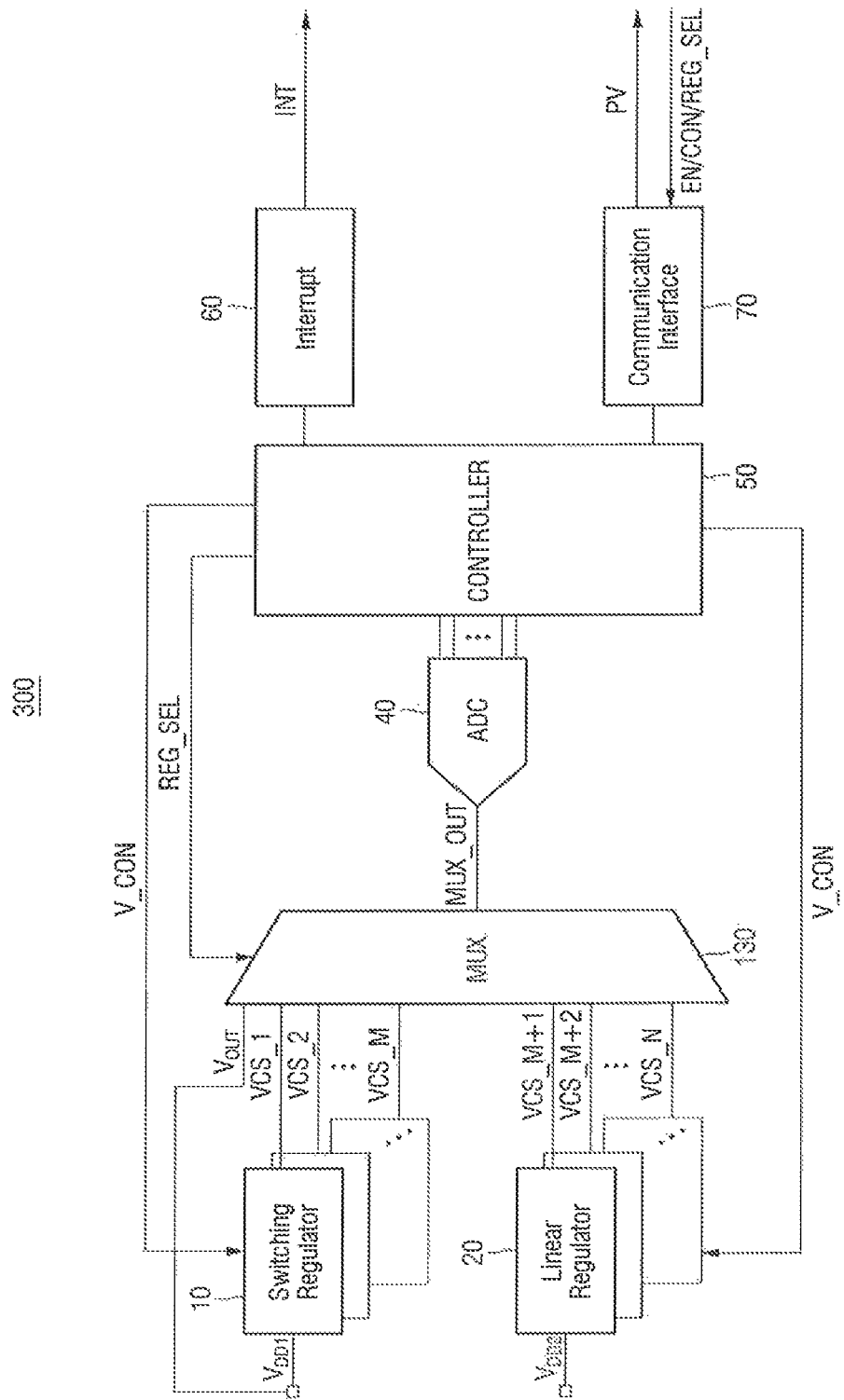
FIG. 7 is a block diagram of a power management integrated circuit included in an electronic device according to an exemplary embodiment of the inventive concept.
Figure 8:
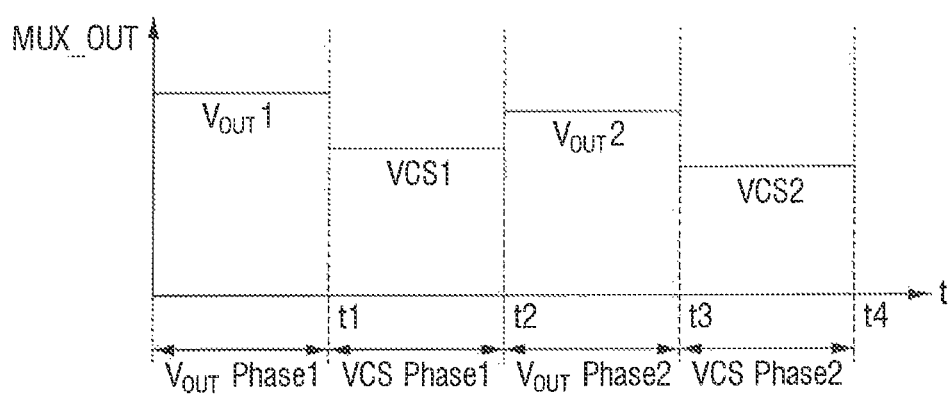
FIG. 8 is a timing chart for explaining an operation of the power management integrated circuit of FIG. 7 according to an exemplary embodiment of the inventive concept.

FIG. 7 is a block diagram of a power management integrated circuit included in an electronic device according to an exemplary embodiment of the inventive concept. FIG. 8 is a timing chart for explaining the operation of the power management integrated circuit of FIG. 7 according to an exemplary embodiment of the inventive concept. Descriptions of components similar to those described above will be omitted.

Referring to FIGS. 7 and 8, in a power management integrated circuit 300, included in the electronic device according to an exemplary embodiment of the inventive concept, a multiplexer 130 may be connected directly to the output terminal of the switching regulator 10 to directly receive the load voltage value $V_{DD1}$ to be supplied to the load device 200.

In the above-described exemplary embodiments, for example, the load voltage value $V_{DD1}$, used by the controller 50 to measure the load power value PV to be provided to the load device 200, has been calculated using the voltage command value V_CON, provided to the switching regulator 10 from the controller 50.

However, in the power management integrated circuit 300, the output terminal of the switching regulator 10 may be connected directly to the multiplexer 130 and the load voltage value $V_{DD1}$ may be provided to the analog-to-digital converter 40. Thus, the controller 50 may receive the output voltage (e.g., the load voltage value $V_{DD1}$) of the output terminal of the switching regulator 10, e.g., an actual load voltage value instead of a value calculated using the voltage command value V_CON. The load power value PV of the load device 200 may be calculated using the actual load voltage value.

The multiplexer 130 may select the load current value VCS measured by the switching regulator 10 and the voltage $V_{OUT}$ of the output terminal of the switching regulator 10 by varying the phase.

As shown in FIG. 8, the multiplexer 130 may alternately select the voltage $V_{OUT}$ of the output terminal of the switching regulator 10 and the load current value VCS of the load device 200 in a predetermined cycle, and provide the selected value as an output MUX_OUT to the analog-to-digital converter 40.

In this case, $V_{OUT}1$ may be an average value of the voltage $V_{OUT}$ in a period of 0~t1, and $V_{OUT}2$ may be an average value of the voltage $V_{OUT}$ in a period of t2~t3. Additionally, VCS1 may be an average value of the load current value VCS_1 in a period of t1~t2, and VCS2 may be an average value of the load current value VCS_2 in a period of t3~t4.

According to an exemplary embodiment of the inventive concept, a sample and hold circuit may be placed between the output terminal of the switching regulator 10 and the controller 50. In other words, a switch included in the sample and hold circuit may sample the voltage $V_{OUT}$ of the output terminal of the switching regulator 10 and a capacitor connected to the ground terminal and one terminal of the switch may hold the voltage $V_{OUT}$. However, this circuit is merely exemplary, and other types of sample and hold circuits may be connected between the output terminal of the switching regulator 10 and the controller 50. Additionally, the switching regulator 10 and the controller 50 may be directly connected to each other without the sample and hold circuit.

In the power management integrated circuit 300, the load voltage value (e.g., $V_{DD1}$) may be received directly from the output terminal of the switching regulator 10. Therefore, even if an error occurs between the voltage command value V_CON provided by the controller 50 and the load voltage value $V_{DD1}$ generated by the switching regulator 10, the voltage $V_{OUT}$/load voltage value $V_{DD1}$ obtained from the output terminal of the switching regulator 10 can be used.

Figure 9:
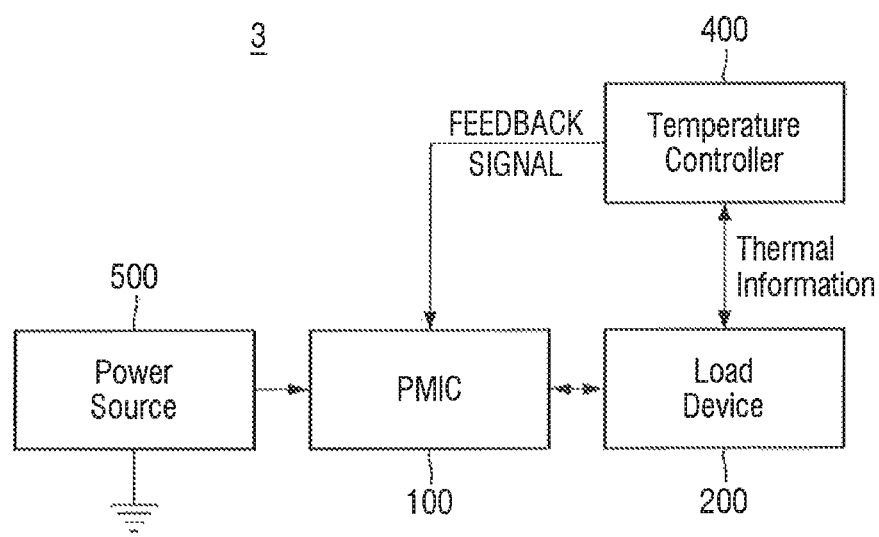
FIG. 9 is a block diagram of an electronic device according to an exemplary embodiment of the inventive concept.

FIG. 9 is a block diagram of an electronic device according to an exemplary embodiment of the inventive concept. Descriptions of elements similar to those described above will be omitted.

Referring to FIG. 9, an electronic device 3 according to an exemplary embodiment of the inventive concept may include the power management integrated circuit 100, the load device 200, a temperature controller 400, and a power source 500.

The power source 500 may provide power to the power management integrated circuit 100. The power source 500 may be, for example, a battery which supplies DC power to the power management integrated circuit 100. Alternatively, the power source 500 may be a power unit including an adapter block which receives commercial AC power, performs AC-DC conversion, and supplies the converted DC power to the power management integrated circuit 100.

The temperature controller 400 may measure a surface temperature or core temperature of the load device 200, and provide a feedback signal, based on the measured temperature value (e.g., thermal information), to the power management integrated circuit 100. In this case, the temperature controller 400 may be a semiconductor device packaged in the same semiconductor package as the load device 200, or may be another functional block for measuring the temperature of the load device 200 in one semiconductor device.

As an example, the temperature controller 400 may provide the feedback signal to the power management integrated circuit 100 if the temperature of the load device 200 exceeds a predetermined threshold value.

The power management integrated circuit 100 may adjust the load power value PV to be supplied to the load device 200 based on the feedback signal provided from the temperature controller 400. In this case, the power management integrated circuit 100 may adjust the load power value PV by changing the load voltage value (e.g., $V_{DD1}$) or the load current value (e.g., VCS).

In other words, when the temperature of the load device 200 exceeds the predetermined threshold value, based on the feedback signal provided from the temperature controller 400, the power management integrated circuit 100 reduces the load power value PV to be supplied to the load device 200 to reduce the heat generated by the load device 200. Accordingly, the temperature of the load device 200 may be lowered to below the predetermined threshold value.

In exemplary embodiments of the inventive concept, the temperature controller 400 may provide the feedback signal directly to the load device 200. The load device 200, which has received the feedback signal, may reduce the load power value PV provided from the power management integrated circuit 100 by changing an internal operation frequency, or by turning off some functional blocks that form the load device 200. As a result, the temperature of the load device 200 can be reduced to below the threshold value.

While the inventive concept has been shown and described with reference to exemplary embodiments thereof, it will be apparent to those of ordinary skill in the art that various modifications in form and details may be made thereto without materially departing from the spirit and scope of the present inventive concept as defined by the following claims.

What is claimed is:

1. An electronic device comprising:
 a power management integrated circuit configured to calculate a load power value and provide the load power value to a load device in response to a request from the load device connected to the power management integrated circuit,
 wherein the power management integrated circuit comprises:
  a plurality of regulators, each comprising a current meter for measuring a load current value to be provided to the load device; and
  a controller configured to calculate the load power value by using the load current value measured by the current meter and a load voltage value provided from each of the plurality of regulators to the load device.

2. The electronic device of claim 1, wherein the power management integrated circuit further comprises:
 a multiplexer configured to select the load current value provided by one of the plurality of regulators; and
 an analog-to-digital converter (ADC) configured to perform analog-to-digital conversion on the selected load current value provided from the multiplexer to output a converted load current value.

3. The electronic device of claim 2, wherein the load device is configured to provide an enable signal and a regulator selection signal to the power management integrated circuit,
 the multiplexer is configured to select the load current value provided by one of the plurality of regulators in response to the regulator selection signal, and
 the ADC is configured to provide the converted load current value to the controller.

4. The electronic device of claim 2, wherein the controller is configured to calculate the load power value by using the selected load current value converted by the ADC and the load voltage value provided from one of the plurality of regulators, and
 the controller is configured to provide the load power value with an interrupt signal to the load device.

5. The electronic device of claim 2, wherein the current meter of each of the plurality of regulators is configured to convert the load current value into a voltage level and to provide the voltage level to the multiplexer.

6. The electronic device of claim 2, wherein the multiplexer is configured to receive an output voltage of an output terminal of each of the plurality of regulators, and configured to select and output either the load current value of one of the plurality of regulators or the output voltage of one of the plurality of regulators.

7. The electronic device of claim 1, wherein each of the plurality of regulators is configured to adjust the load voltage value thereof by adjusting a switching period in accordance with a voltage command value provided by the controller, and
 the controller is configured to calculate the load power value by using the voltage command value and the load current value.

8. The electronic device of claim 1, wherein each of the plurality of regulators comprises a buck converter, and
 the current meter is configured to measure a current value flowing through an inductor included in the buck converter.

9. The electronic device of claim 8, wherein the buck converter comprises a PMOS transistor connected to a power supply voltage and an NMOS transistor connected to a ground voltage, and
 the PMOS transistor and the NMOS transistor are turned on/off alternately according to a predetermined cycle to generate an output voltage.

10. The electronic device of claim 1, wherein the load device is configured to provide an enable signal and a regulator selection signal to the power management integrated circuit, and
 the power management integrated circuit is configured to measure the load current value of one of the plurality of regulators corresponding to the regulator selection signal in response to the enable signal, and to provide the load power value with an interrupt signal to the load device.

11. An electronic device comprising:
a power management integrated circuit configured to calculate a load power value and provide the load power value to a load device in response to a request from the load device connected to the power management integrated circuit,
wherein the power management integrated circuit comprises:
at least one regulator comprising a current meter for measuring a load current value to be provided to the load device; and
a controller comprising an arithmetic unit configured to calculate the load power value by using the load current value measured by the at least one regulator and a load voltage value provided from the at least one regulator to the load device.

12. The electronic device of claim 11, wherein the controller comprises a register configured to store a change history of the load current value and the load voltage value.

13. The electronic device of claim 12, wherein the arithmetic unit is configured to receive the change history of the load current value and the load voltage value stored in the register, and to calculate an average value of the load power value over a predetermined time period.

14. The electronic device of claim 11, wherein the controller is configured to generate a voltage command value for controlling an output voltage of the at least one regulator and provide the voltage command value to the at least one regulator, and
the arithmetic unit is configured to calculate the load power value by using the load current value and the voltage command value.

15. The electronic device of claim 11, wherein the at least one regulator comprises a buck converter, and
the current meter is configured to measure a current value flowing through an inductor included in the buck converter.

16. A method of operating an electronic device comprising a load device and a power management integrated circuit, the method comprising:
determining whether a first enable signal and a control signal have been received from the load device;
selecting, at a multiplexer included in the power management integrated circuit, a load current value in response to the control signal;
performing analog-to-digital conversion of the load current value to output a digital load current value;
storing a change history of a voltage command value, generated by a controller included in the power management integrated circuit, over a predetermined amount of time;
calculating an average value of the voltage command value using the change history; and
determining a load voltage value using the average value of the voltage command value,
calculating a load power value using the digital load current value and the load voltage value; and
outputting the load power value to the load device.

17. The method of claim 16, wherein outputting the load power value is terminated if a second enable signal is not received.

18. The method of claim 16, wherein the load power value is continuously updated and output to the load device until a turn-off signal is provided from the load device.

* * * * *